April 28, 1925.  1,535,524
J. J. FAIRBAIRN
GEAR CASE
Filed July 25, 1924
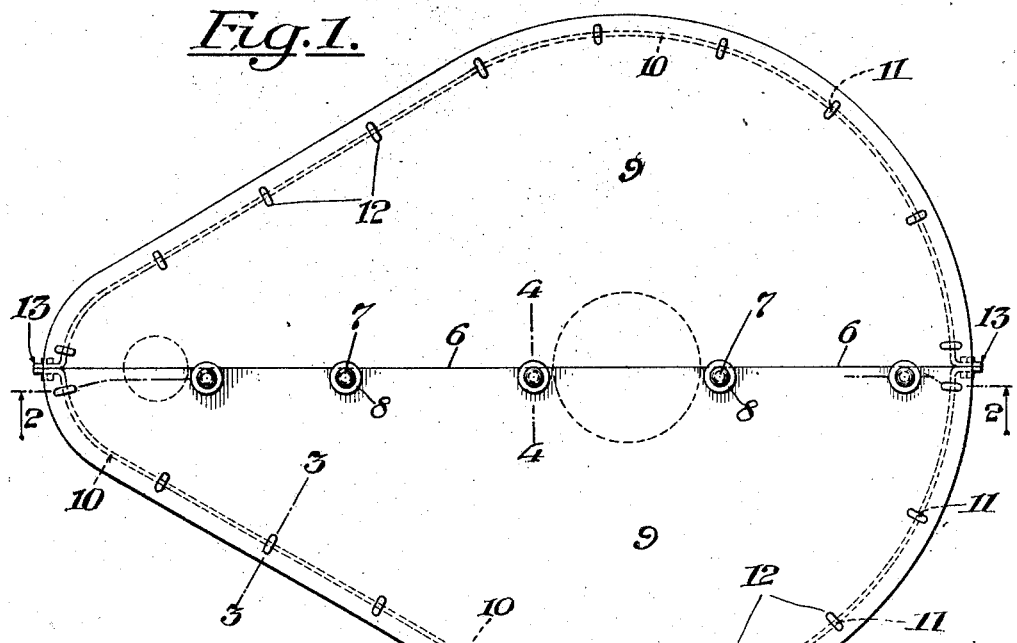
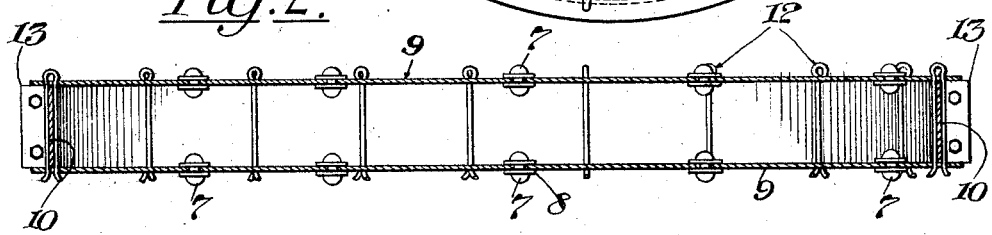
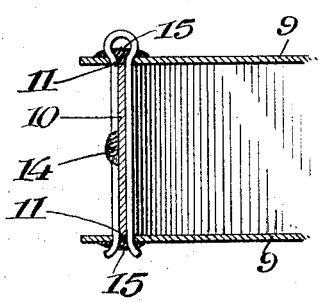
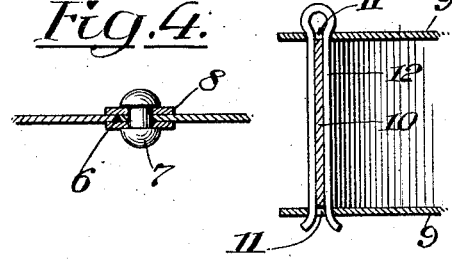
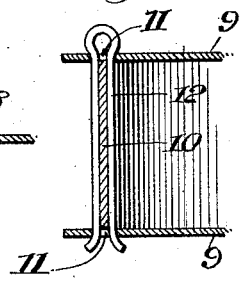
Inventor
John James Fairbairn
by his Attorney
John R. Nolan Patented Apr. 28, 1925.

1,535,524

UNITED STATES PATENT OFFICE.

JOHN JAMES FAIRBAIRN, OF ROOSEVELT, NEW YORK.

GEAR CASE.

Application filed July 25, 1924. Serial No. 728,086.

*To all whom it may concern:*

Be it known that I, JOHN JAMES FAIRBAIRN, a citizen of the United States, and resident of Roosevelt, in the county of Nassau and State of New York, have invented certain new and useful Improvements in Gear Cases, of which the following is a specification.

This invention relates to gear cases, and its object is to provide a construction which shall be relatively inexpensive to manufacture, and shall combine lightness with strength and durability.

My invention consists of a gear case constructed of sheet metal parts which are connected in a novel manner to produce a rigid and stable structure, the connecting means comprising preferably, cotter pins, which, in one aspect of my invention, are welded to the walls of the gear case, as will be hereinafter described and claimed.

In the drawings—

Figure 1 is a side elevation of a gear case embodying a preferred form of my invention.

Fig. 2 is a longitudinal section of the same, as on the line 2—2 of Fig. 1.

Fig. 3 is an enlarged transverse section through the side and edge walls of the gear case, as on the line 3—3 of Fig. 1.

Fig. 4 is a similar section, as on the line 4—4 of Fig. 1.

Fig. 5 is a similar view showing the straddling connecting elements as welded to the walls of the gear case.

The general form of gear case herein illustrated comprises two complementary trough-shaped sections of sheet metal medially joined as at 6, and united at intervals by spaced rivets 7 and associated washers 8.

Each of the sections comprises two side plates 9 spaced apart adjacent their outer curved edges by an interposed edge plate 10. According to my invention the plates 9 are correspondingly perforated at intervals, as at 11, to receive connecting elements which straddle the plate 10. These elements in the preferred form of my invention comprise cotter pins 12, as shown. The loop of each pin bears hard against one of the side walls while the legs embrace the edge plate and protrude through the perforation of the other wall, their free extremities being spread apart so as to bear against the latter. The meeting ends of the edge plates 10 are preferably flanged, as at 13; and the abutting flanges are bolted or otherwise fastened together.

With the described construction it will be seen that the parts of the gear case can be readily assembled and secured in proper relation to each other; and that the cotter pins not only hold the side plates and the edge plate rigidly and securely together, but they serve to brace and reinforce the edge plate on both sides thereof, thus strengthening the structure as a whole.

In large or heavy structures, the embracing members of the connecting elements are welded to the body of the edge plate, as at 14, and the end portions of such members are welded through the perforations to the edge plates and to the adjacent portions of the side plates, as at 15. The exteriorly protruding extremities of the cotter pins may be removed, if desired.

I claim—

1. A gear case comprising spaced-apart metal side plates correspondingly perforated at intervals adjacent their edges, an edge plate interposed between the side plates, and a series of connecting elements extending through the respective perforations of the side plates, each element including two leg members straddling the edge plate throughout its width.

2. A gear case comprising spaced-apart metal side plates correspondingly perforated at intervals adjacent their edges, an edge plate interposed between the side plates, and a series of connecting elements extending through the respective perforations of the side plates, each element including two leg members straddling the edge plate throughout its width and being welded thereto.

3. A gear case comprising spaced-apart metal side plates correspondingly perforated at intervals adjacent their edges, an edge plate interposed between the side plates, and a series of cotter pins extending through the respective perforations of the side plates, the legs of said pins straddling the edge plate throughout its width.

4. A gear case comprising spaced-apart metal side plates correspondingly perforated at intervals adjacent their edges, an edge plate interposed between the side plates, and a series of cotter pins extending through the respective perforations of the side plates, the legs of said pins straddling the edge plate throughout its width and being welded thereto.

5. A gear case comprising spaced-apart metal side plates correspondingly perforated at intervals adjacent their edges, an edge plate interposed between the side plates, and a series of cotter pins extending through the respective perforations of the side plates, said pins being welded at the perforations to the side and edge plates and also to the body of the edge plate.

Signed at New York, in the county and State of New York, this 22d day of July, A. D. 1924.

JOHN JAMES FAIRBAIRN.